US011913622B2

United States Patent
McDonald et al.

(10) Patent No.: US 11,913,622 B2
(45) Date of Patent: *Feb. 27, 2024

(54) SPHERICAL MOTION SENSOR HOUSING FOR OUTDOOR SECURITY LIGHT

(71) Applicant: Heathco LLC, Bowling Green, KY (US)

(72) Inventors: Miles William McDonald, Bowling Green, KY (US); Kushagra Dixit, Bowling Green, KY (US); Scott Blaise Tylicki, Bowling Green, KY (US); Apollo Paul Paredes, Livonia, MI (US); Lionel V. Luu, Bowling Green, KY (US); John Colvin Deaton, Bowling Green, KY (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,439

(22) Filed: Jan. 25, 2023

(65) Prior Publication Data
US 2023/0160547 A1 May 25, 2023

Related U.S. Application Data

(63) Continuation of application No. 17/723,869, filed on Apr. 19, 2022, now Pat. No. 11,572,990, which is a
(Continued)

(51) Int. Cl.
*F21S 8/00* (2006.01)
*F21S 9/03* (2006.01)
(Continued)

(52) U.S. Cl.
CPC .............. *F21S 8/003* (2013.01); *F21S 9/032* (2013.01); *F21S 9/037* (2013.01); *F21V 21/30* (2013.01);
(Continued)

(58) Field of Classification Search
CPC ............ F21V 23/0478; F21V 23/0471; F21V 23/0442; F21V 23/04; F21V 23/023;
(Continued)

(56) References Cited

U.S. PATENT DOCUMENTS

| 4,225,881 A | 9/1980 | Tovi |
| 5,258,899 A | 11/1993 | Chen |

(Continued)

FOREIGN PATENT DOCUMENTS

| AU | 2018100335 | 6/2018 |
| CA | 2609531 | 11/2006 |

(Continued)

OTHER PUBLICATIONS

IQ America, 1801 Motion Sensor LED Lights, IQ America Instruction Manual, dated Jan. 5, 2016.
(Continued)

*Primary Examiner* — John R Lee
(74) *Attorney, Agent, or Firm* — Gray Ice Higdon

(57) ABSTRACT

The present disclosure sets forth a motion sensing outdoor security light with the flexibility of being mounted to either a wall structure or to an eave or ceiling structure. An adjustable spherical motion sensor housing may be provided with the rotationally adjustable outdoor security light, allowing easy adjustment of motion detection ranges under different mounting schemes without comprising the aesthetic design of the light. The adjustable spherical motion sensor housing may also provide an enlarged horizontal field of view for better performance.

17 Claims, 9 Drawing Sheets

Related U.S. Application Data continuation of application No. 17/334,917, filed on May 31, 2021, now Pat. No. 11,313,547.

(60) Provisional application No. 63/077,848, filed on Sep. 14, 2020.

(51) Int. Cl.

| | |
|---|---|
| *F21V 23/04* | (2006.01) |
| *F21V 23/02* | (2006.01) |
| *G01J 5/00* | (2022.01) |
| *G02B 19/00* | (2006.01) |
| *F21V 21/30* | (2006.01) |
| *H05B 47/115* | (2020.01) |
| *H05B 45/10* | (2020.01) |
| *G01J 1/02* | (2006.01) |
| *G01J 1/04* | (2006.01) |
| *G01V 3/12* | (2006.01) |
| *F21Y 115/10* | (2016.01) |
| *F21W 131/10* | (2006.01) |

(52) U.S. Cl.
CPC .......... *F21V 23/023* (2013.01); *F21V 23/04* (2013.01); *F21V 23/0471* (2013.01); *F21V 23/0478* (2013.01); *G01J 1/0214* (2013.01); *G01J 1/0411* (2013.01); *G01J 5/0025* (2013.01); *G01V 3/12* (2013.01); *G02B 19/0009* (2013.01); *G02B 19/0076* (2013.01); *H05B 45/10* (2020.01); *H05B 47/115* (2020.01); *F21W 2131/10* (2013.01); *F21Y 2115/10* (2016.08)

(58) Field of Classification Search
CPC . F21V 21/14; F21V 21/30; F21S 8/003; F21S 9/037; F21S 9/035; F21S 9/032; G01J 1/0214; G01J 1/0411; G01J 1/0407; G01J 1/0403; G01J 5/0025; G01J 5/0022; G01V 3/12; G02B 19/0076; G02B 19/008; G02B 19/009; F21W 2131/10; F21Y 2115/10; H05B 47/13; H05B 47/105; H05B 47/115; H05B 47/10
See application file for complete search history.

(56) References Cited

U.S. PATENT DOCUMENTS

| | | | |
|---|---|---|---|
| 5,394,209 A | 2/1995 | Stiepel et al. | |
| 5,649,761 A | 7/1997 | Sandell et al. | |
| 6,147,701 A | 11/2000 | Tamura et al. | |
| 6,196,705 B1 | 3/2001 | Finke | |
| 6,764,197 B1 | 7/2004 | Zemar | |
| 6,781,129 B2 | 8/2004 | Leen | |
| 7,375,313 B2 | 5/2008 | Lee | |
| 7,473,899 B2 | 1/2009 | Chi et al. | |
| 7,719,610 B2 | 5/2010 | Kung et al. | |
| 7,800,049 B2 | 9/2010 | Bandringa et al. | |
| 7,855,728 B2 | 12/2010 | Aoki et al. | |
| 8,092,101 B2 | 1/2012 | Basho | |
| 8,567,966 B2 | 10/2013 | Hubbs | |
| 9,172,199 B2 | 10/2015 | Birdwell et al. | |
| 9,188,320 B2 | 11/2015 | Russello et al. | |
| 9,264,619 B2 | 2/2016 | Takizawa | |
| 9,347,767 B2 | 5/2016 | Bridges | |
| 10,107,480 B1 | 10/2018 | Ladewig et al. | |
| 10,142,597 B2 | 11/2018 | Siminoff et al. | |
| 10,154,178 B2 | 12/2018 | Wada et al. | |
| D869,721 S | 12/2019 | Recker et al. | |
| 10,495,492 B2 | 12/2019 | Sar | |
| 10,533,736 B2 | 1/2020 | Chen | |
| 10,718,500 B1 | 7/2020 | Tylicki | |
| 10,721,400 B2 | 7/2020 | Fang | |
| 10,976,645 B2 | 4/2021 | Bingleman et al. | |
| 10,976,647 B2 | 4/2021 | Liao et al. | |
| 11,280,458 B1 | 3/2022 | Mcdonald et al. | |
| 11,300,258 B2 | 4/2022 | Mcdonald et al. | |
| 11,313,547 B2 | 4/2022 | McDonald | |
| 11,346,514 B2 | 5/2022 | Paredes | |
| 11,369,015 B2 | 6/2022 | Thompson et al. | |
| 11,466,824 B1 * | 10/2022 | Thompson | F21V 21/30 |
| 11,506,348 B2 * | 11/2022 | McDonald | H05B 45/10 |
| 11,572,990 B2 * | 2/2023 | McDonald | F21V 23/023 |
| 2004/0090781 A1 | 5/2004 | Yeoh | |
| 2008/0079848 A1 | 4/2008 | Kung et al. | |
| 2008/0094838 A1 | 4/2008 | Russello et al. | |
| 2015/0092408 A1 | 4/2015 | Wallach | |
| 2016/0003461 A1 | 1/2016 | Chen | |
| 2020/0063948 A1 | 2/2020 | Lin et al. | |
| 2020/0192055 A1 | 6/2020 | Nemoto et al. | |
| 2020/0215989 A1 | 7/2020 | Grant et al. | |
| 2020/0326503 A1 | 10/2020 | Kimura | |
| 2022/0082241 A1 | 3/2022 | Mcdonald et al. | |
| 2022/0082242 A1 | 3/2022 | McDonald | |
| 2022/0290825 A1 * | 9/2022 | Paredes | F21V 23/023 |
| 2022/0349534 A1 * | 11/2022 | McDonald | G02B 19/0009 |
| 2023/0037012 A1 * | 2/2023 | Thompson | F21V 23/0478 |
| 2023/0092803 A1 * | 3/2023 | McDonald | H05B 47/115 |
| | | | 362/147 |

FOREIGN PATENT DOCUMENTS

| | | |
|---|---|---|
| CA | 2950554 | 6/2018 |
| CA | 3034040 | 9/2019 |
| CA | 3129083 | 3/2022 |
| EP | 2769193 | 8/2014 |

OTHER PUBLICATIONS

IQ America, Instruction Manual, Motion Sensor LED Lights, LM-1802, Jan. 5, 2016.
Halo, Instruction Manual, Eaton, Retrieved from https://images.homedepot-static.com/catalog/pdfImages/36/36eb2571-b44b-4c59-83c6-9c06541ebd54.pdf, Retrieved on Mar. 27, 2020.
EZVIZ, C6CN Internet PT Camera, Retrieved from, https://www.ezvizlife.com/us/product/c6cn/1903, Retrieved on May 24, 2021.
Mike, How This Sphere-shaped Home Security Camera is Making Waves on Kickstarter, SHOUTS Tech Culture and Lifestyle Stuff, Retrieved from: https://mikeshouts.com/litmor-battery-powered-security-camera/, Aug. 5, 2019.
Sony, YT-ICB124 In-ceiling mount bracket for SNC-RH/RS series, Retrieved from: https://pro.sony/ue_US/products/security-camera-mounting-hardware/yt-icb124, Retrieved on May 24, 2021.
MegaIP, MegaIP Camera Series, AV Costar, Retrieved from: https://arecontvision.com/family/megaip, Retrieved on May 24, 2021.
Canadian Intellectual Property Office: First Examiner's Report issued for Application No. 3,127,085, 7 pages, dated Nov. 28, 2023.
Canadian Intellectual Property Office: First Examiner's Report issued for Application No. 3,129,809, 8 pages, dated Nov. 29, 2023.
Canadian Intellectual Property Office: First Examiner's Report issued for Application No. 3,127,073, 9 pages, dated Dec. 7, 2023.
Canadian Intellectual Property Office: First Examiner's Report issued for Application No. 3,125,803, 7 pages, dated Nov. 23, 2023.

\* cited by examiner

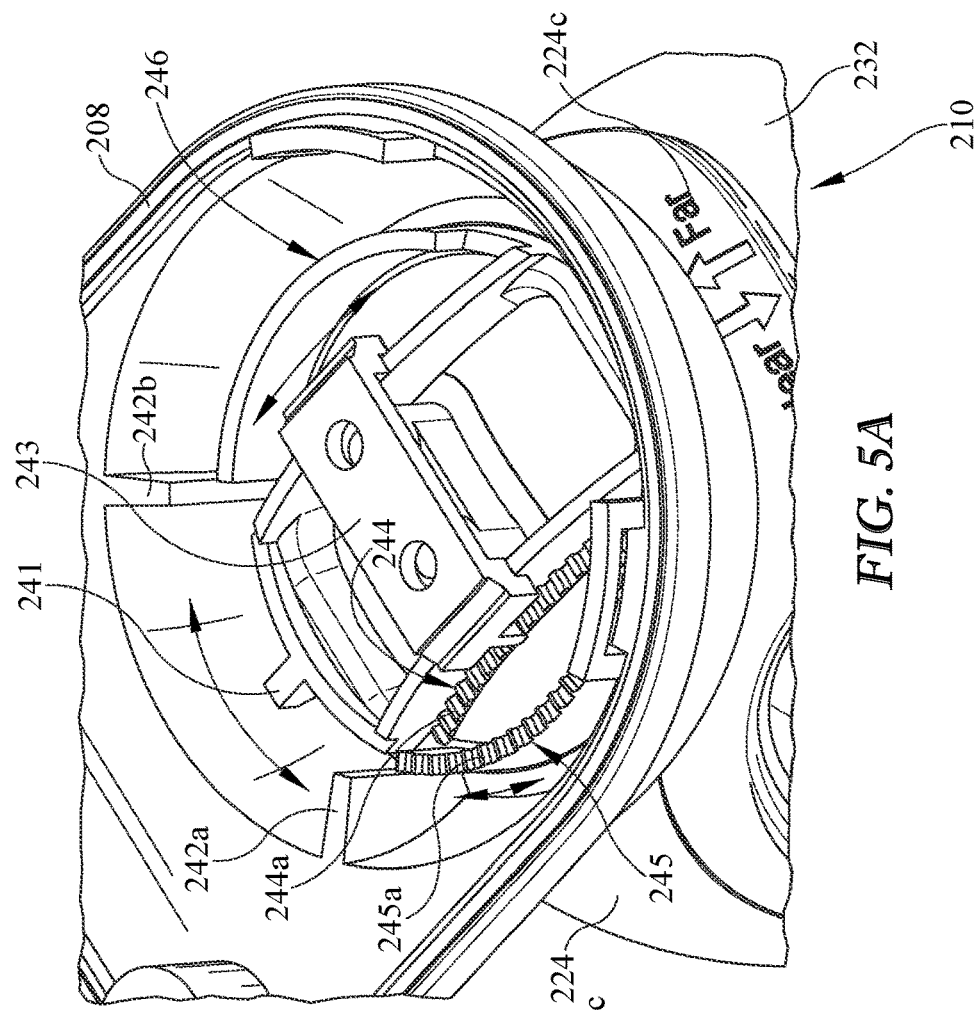
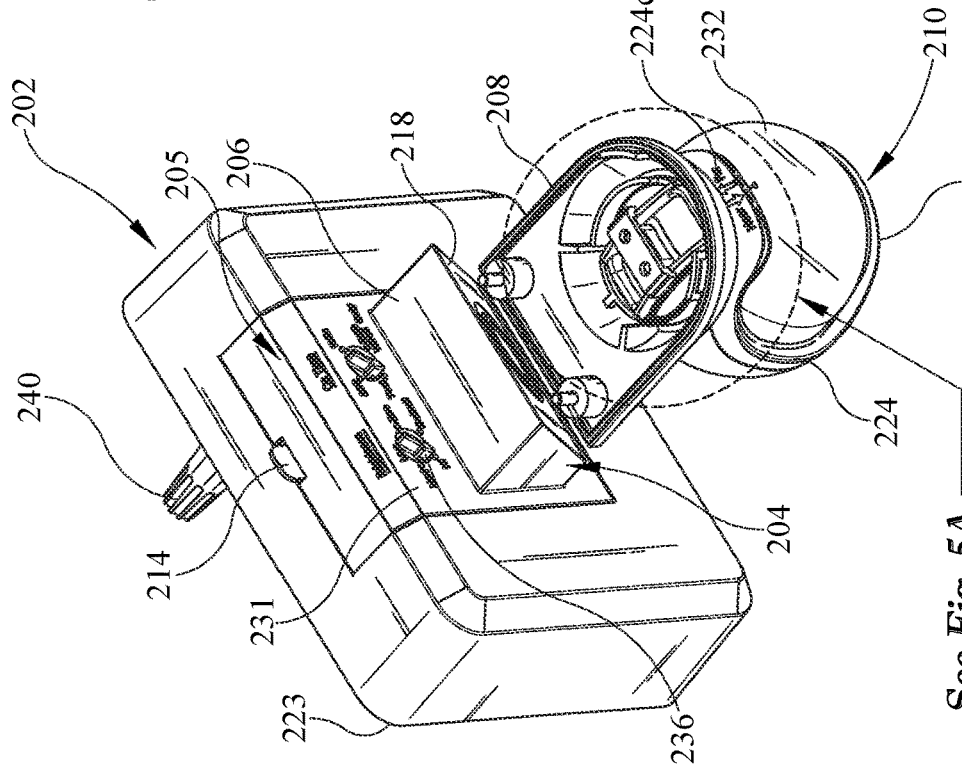
FIG. 5A
FIG. 5

SPHERICAL MOTION SENSOR HOUSING FOR OUTDOOR SECURITY LIGHT

BACKGROUND

Motion based security lighting typically includes a motion sensor which is fixed to a luminaire housing. Such design prevents variability for motion detection in some situations. This disclosed security light motion sensor design provides a broader horizontal field of view and enables the sensor to be adjusted after installation to obtain a desired coverage ranges.

Motion or occupancy sensors are designed to save energy by detecting the presence of a moving object in a specific predetermined area of coverage and switching a light source on and off depending upon the presence of the moving object. Specifically, when a moving object is detected within the area of coverage, the light source is turned on. In the alternative, when motion is not detected indicating that the area of coverage is not occupied, the light source is turned off after a predetermined period of time. Motion sensors are thus enabled to reduce electrical energy waste by taking over the functions of a light switch or an electrical outlet. Accordingly, outdoor security light fixtures with motion sensors are available for serving as light sources in a variety of areas, such as passageways, streets, parking lots, and gardens, and are energy-efficient and permit their attached luminaries to have longer lifetimes than conventional ones because they are activated only when an object, such as a person or a motor vehicle, approaches. A popular form of such a light fixture includes a motion sensor that is responsive to infrared radiation emitted by a person or motor vehicle as the person or vehicle moves within the field of view of the device. These devices are generally referred to as passive infrared, or "PIR" motion sensors. These sensors are incorporated into the light fixture housing to trigger the lighting upon detection of the person, motor vehicle, or like heat emitting objects. Typically, the motion sensors detect the presence of those objects in a specific predetermined area defined by preset coordinates.

As each motion sensor has a particular field of view for motion detection, it is important that the field of view of the motion sensors entirely cover the desired area so an object can be detected. Specifically, installation of such motion sensing light fixtures requires forethought regarding the proper mounting and orientation as the motion sensors work best when they are pointed at the desired motion detection areas. However, the coordinates of these areas of interest are often not known at the time the light fixture is installed, and there are also times when these coordinates in addition to other variables need adjustments (e.g., the field of view of the motion sensor at the installation may be too wide or too narrow to fully meet a particular user's needs). Thus, often the motion sensor's orientation has to be changed when environment changes occur that modify the motion pattern of an area such as new constructions, traffic pattern changes, etc.

Most existing motion sensing light fixtures have a fixed and limited field of view, and adjustments for the sensor or sensor housing orientation is usually not allowed. Even if adjustments to function optimally in a particular location is possible for some traditional motion sensing light fixtures, it may not allow easy toolless manual adjustments of the sensor's performance. For example, most existing motion sensors require the use of a tool, such as a screwdriver, to remove an access cover to make adjustments. Sometimes tools are not readily available, and even when these tools are accessible, the adjustment may require disassembly and reassembly of a few parts including the housing of the security light. This type of adjustment is not only cumbersome and awkward, but damage may also occur during disassembly and reassembly. Also, there are times when the aesthetic design of the light fixture may be compromised in order to provide a more favorable orientation scheme for motion detection.

SUMMARY

The present disclosure is directed generally to an outdoor security light, including a single or multi-axis adjustable motion sensor housing in a spherical configuration with a limited vertical field of view while expanding the lateral or horizontal field of view to 240 degrees or more. The disclosed light fixtures may, for example, illuminate a walkway or driveway when a person or a motor vehicle approaches. The spherical configuration allows a user to adjust/rotate the motion sensor readily against the mounting surface without comprising the aesthetic design of the light.

By providing a rotationally adjustable spherical motion sensor or sensor housing mounted on the luminaire housing improves ease of field of view adjustment of the motion sensor while also increasing variability of installation location. Providing a motion sensor housing in a spherical configuration separate from the luminaire housing further ease of installation and improves the aesthetic design.

Consistent with various aspects of the present disclosure, a spherical motion sensor housing mounted on an outdoor security light canopy is disclosed. The spherical motion sensor housing may comprise a spherical shroud including a first shroud hemisphere and a second shroud hemisphere. The first shroud hemisphere includes a lens opening, a first occluding portion, and a second occluding portion, and the first occluding portion and the second occluding portion may be in opposing relationship within the lens opening and extending inwards towards each other. In some embodiments, the lens opening may be defined by a center opening portion, a first horizontal extent opening portion, and a second horizontal extent opening portion. The spherical motion sensor housing may further comprise a lens covering the lens opening of the spherical shroud and a motion detection unit mounted within the spherical shroud. The motion detection unit has an optical field of view for motion detection through the lens, and the optical field of view for motion detection includes a horizontal field of view and a vertical field of view. The horizontal field of view of the motion detection unit is expanded by the first horizontal extent opening portion of the lens opening and by the second horizontal extent opening portion of the lens opening, and the vertical field of view of the motion detection unit is limited by the first occluding portion of the first shroud hemisphere and the second occluding portion of the first shroud hemisphere.

One or more of the following may be optionally included with spherical motion sensor housing. In some embodiments, each of the first occluding portion and the second occluding portion is a tab with a curved surface. In some embodiments, the lens is in a partial spherical arc. In some other embodiments, the motion detection unit includes at least one PIR sensor mounted within the spherical shroud. In such embodiments, the lens is a segmented Fresnel lens comprising a plurality of sections, and each section is capable of independently focusing infrared radiation for the at least one PIR sensor. In some embodiments, the lens is curved in a conical or convex shape. In such embodiments, the at least one PIR sensor may include a first, second and third PIR sensors mounted within the spherical shroud, and facing the center opening portion, the first horizontal extent opening portion, and the second horizontal extent opening portion respectively. In such embodiments, the motion detection unit further includes a mounting surface, and the first, second, and third PIR sensors are mounted on the mounting surface by a mounting block. The mounting block has a plurality of surfaces for holding the first, second, and third PIR sensors. In such embodiments, the mounting surface may be mounted internally within the spherical shroud to a rear portion of the second shroud hemisphere. In some embodiments, the mounting surface is a printed circuit board mounted within the spherical shroud and carries the mounting block with the first, second, and third PIR sensors on a first circuit board face thereof behind the lens. In some embodiments, the motion detection unit is mounted within the spherical shroud proximal to a rear portion of the spherical shroud and distal from the lens.

To promote motion detection performance, in some further embodiments, the first shroud occluding portion and the second shroud occluding portion may provide the motion detection unit mounted within the spherical shroud with an effective vertical angular field of view of about 40 degrees or less. In some embodiments, the lens opening defined by the center opening portion, the first horizontal extent opening portion, and the second horizontal extent opening portion may provide the motion detection unit mounted within the spherical shroud with an effective horizontal angular field of view of about 240 degrees or more.

In various embodiments, to implement modification and adjustability of the spherical motion sensor housing, the outdoor security light canopy may retain a supporting cup and the spherical motion sensor housing is mounted on the outdoor security light canopy by the supporting cup, the spherical shroud may have a first interfacing tab attached thereto, the supporting cup may have a first gear rack mounted thereon, and the first gear rack includes a plurality of first interfacing notches configured to mate with the first interfacing tab to allow the first interfacing tab to move along the first gear rack and allow a first axis adjustment of the spherical motion sensor housing. In some embodiments, the first interfacing tab is attached to the second shroud hemisphere of the spherical shroud through a stem.

In some variations, a second interfacing tab may be attached to the outdoor security light canopy, and the supporting cup further includes a second gear rack mounted thereon including a plurality of second interfacing notches configured to mate with the second interfacing tab to allow the second interfacing tab to move along the second gear rack to allow a second axis adjustment of the spherical motion sensor housing. In some embodiments, the plurality of first interfacing notches of the first gear rack are provided on an arcuate/inclined surface in a linear configuration, while the plurality of second interfacing notches of the second gear rack are provided on a planar surface.

In some other embodiments, the supporting cup further comprises at least one outwardly directed projection and at least one stop mounted within the security light canopy to limit the second axis adjustment of the spherical motion sensor housing by abutting the at least one outwardly directed projection against the at least one stop.

In some embodiments, the spherical motion sensor housing may comprise a spherical shroud including a lens opening, a first occluding portion, and a second occluding portion, and the first occluding portion and the second occluding portion may be in opposing relationship within the lens opening and extending inwards towards each other. In some embodiments, the lens opening may be defined by a center opening portion, a first horizontal extent opening portion, and a second horizontal extent opening portion. The spherical motion sensor housing may further comprise a lens covering the lens opening of the spherical shroud and a motion detection unit mounted within the spherical shroud. The motion detection unit has an optical field of view for motion detection through the lens, and the optical field of view for motion detection includes a horizontal field of view and a vertical field of view. The horizontal field of view of the motion detection unit is expanded by the first horizontal extent opening portion of the lens opening and by the second horizontal extent opening portion of the lens opening, and the vertical field of view of the motion detection unit is limited by the first occluding portion and the second occluding portion.

In still further embodiments, the spherical motion sensor housing may comprise a spherical shroud including a lens opening, a first occluding portion, and a second occluding portion, and the first occluding portion and the second occluding portion may be in opposing relationship within the lens opening and extending inwards towards each other. The spherical motion sensor housing may further comprise a lens covering the lens opening of the spherical shroud and a motion detection unit mounted within the spherical shroud. The motion detection unit has an optical field of view for motion detection through the lens, and the optical field of view for motion detection includes a horizontal field of view and a vertical field of view. The vertical field of view of the motion detection unit is limited by the first occluding portion and the second occluding portion.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure

FIG. 5 and FIG. 5A, FIG. 5B, and FIG. 5C illustrate various adjustment mechanisms of an adjustable spherical motion sensor housing, according to different embodiments of the present disclosure.

DETAILED DESCRIPTION

Figure 1B:
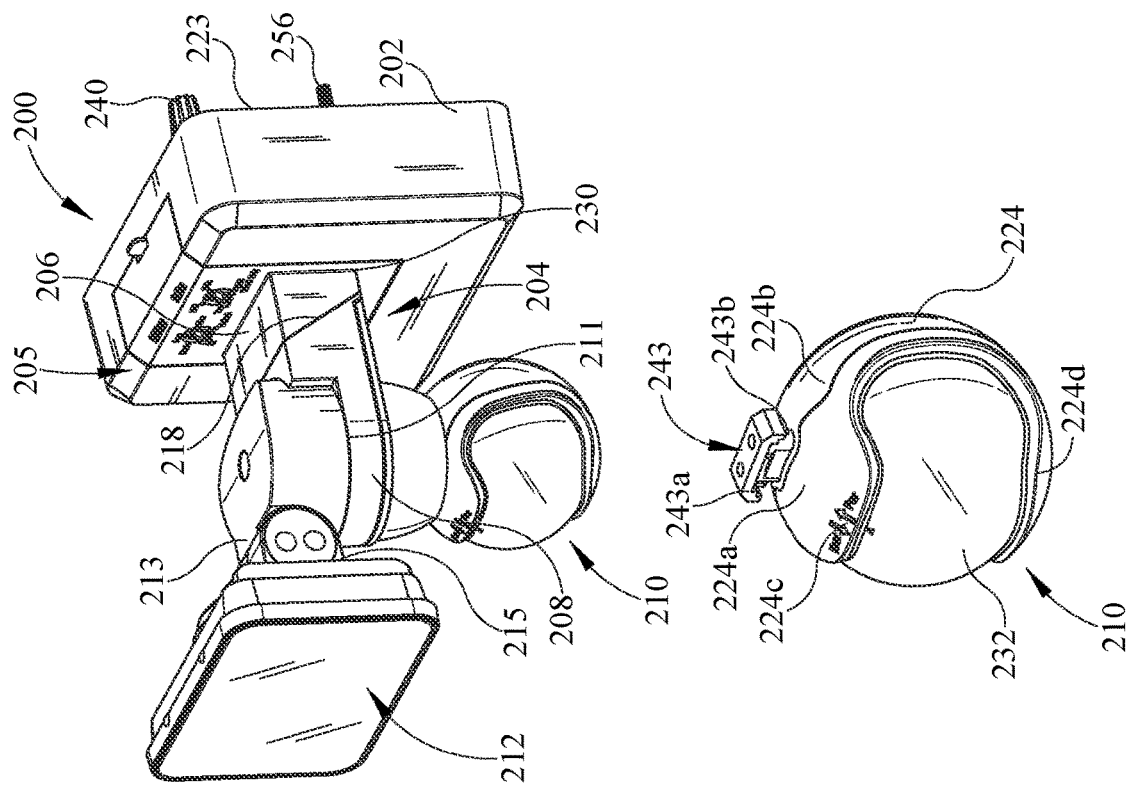
FIG. 1B is a prospective view of another rotationally adjustable outdoor security light with a motion sensor mounted from the top, according to another embodiment of the present disclosure.
Figure 1A:
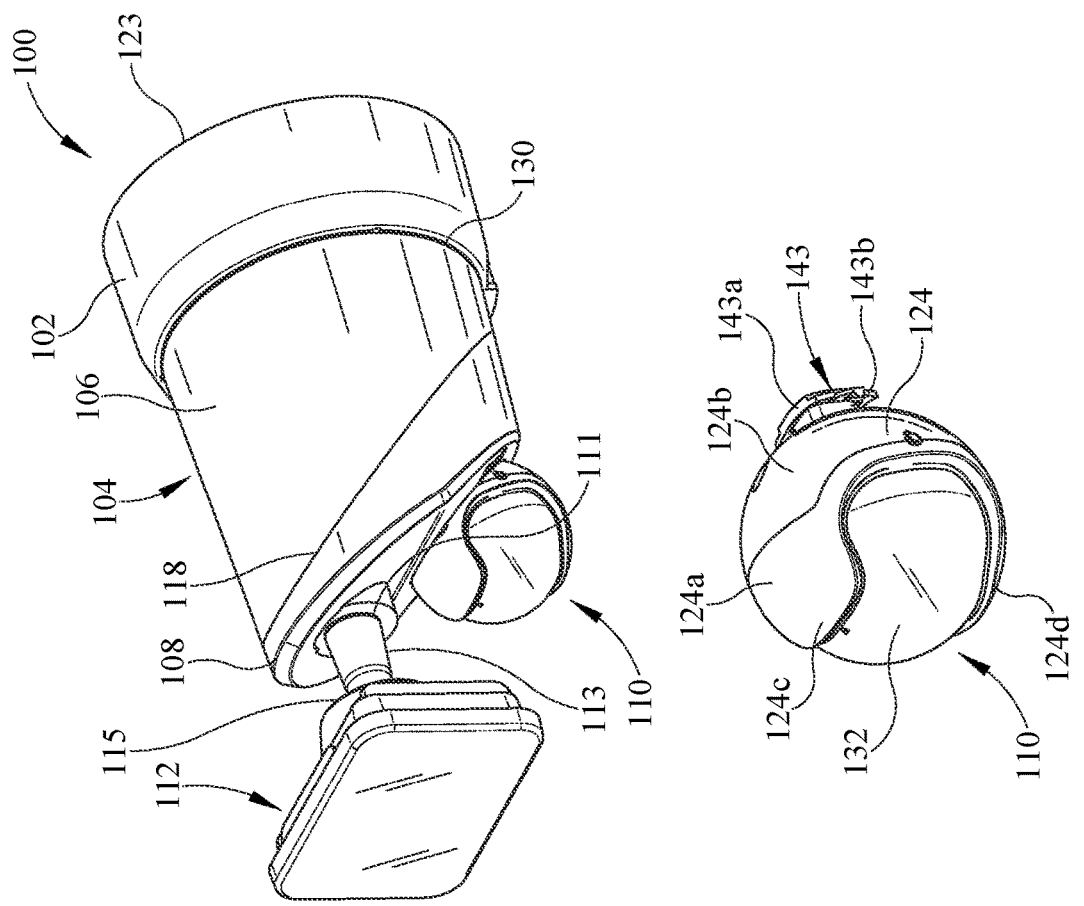
FIG. 1A is a prospective view of a rotationally adjustable outdoor security light with a motion sensor mounted from the rear, according to an embodiment of the present disclosure.
Figure 2:
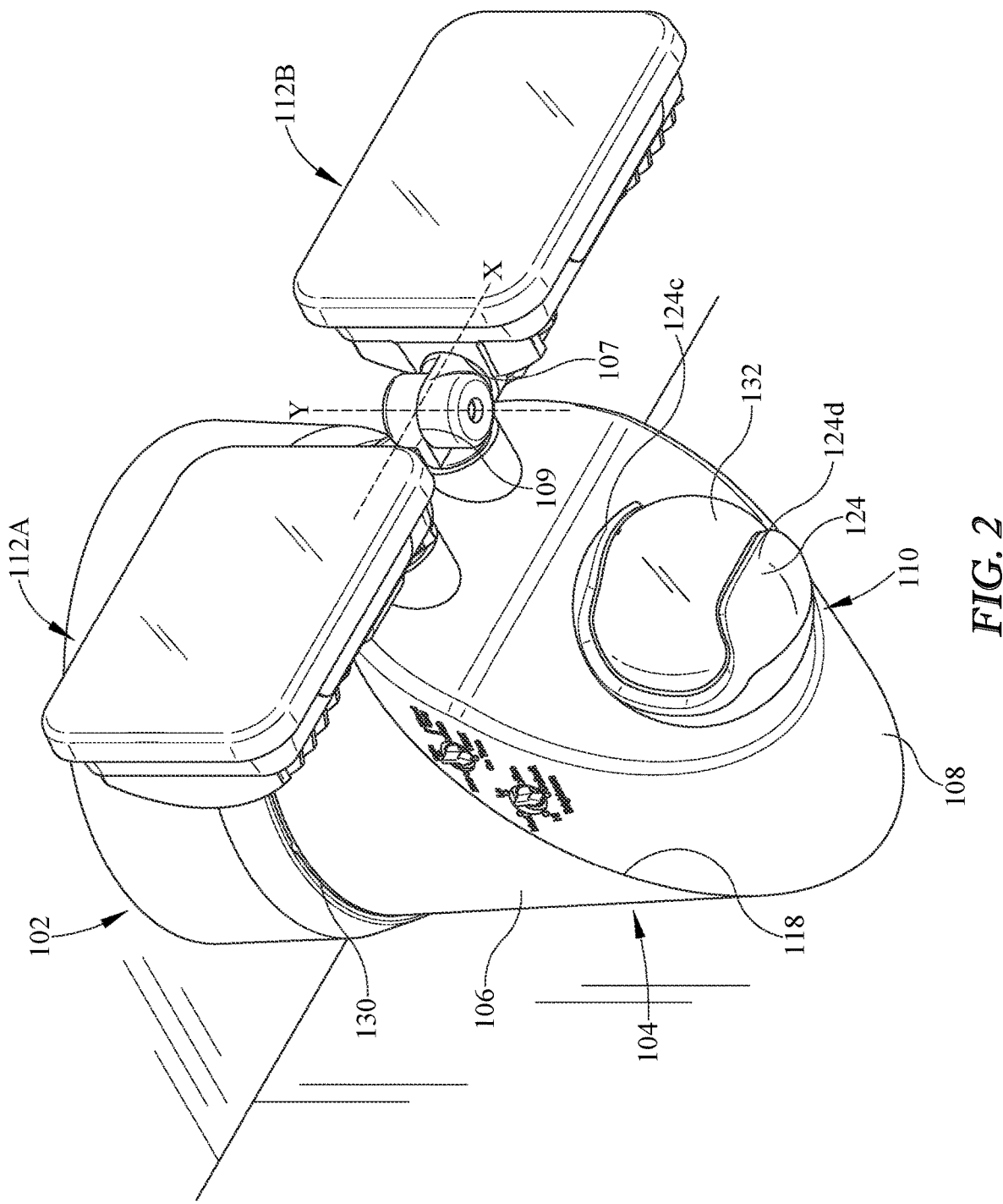
FIG. 2 is a perspective view of the rotationally adjustable outdoor security light of FIG. 1A mounted under an eave with two lamp heads, according to an embodiment of the present disclosure.

As depicted in the drawings, wherein like numbers denote like parts throughout the several views, various rotationally adjustable outdoor security light 100, 200 in accordance with various embodiments will be described with reference to the accompanying drawings. Mounting of the security light 100, 200 may be implemented under various scenarios, and FIGS. 1A, 1B, and 2 illustrate two typical installations and orientations of the security light 100, 200 to display the overall adjustability with the security light 100, 200. FIGS. 1A and 1B the security light 100, 200 is installed on a wall in a vertical orientation against a wall surface, while in FIG. 2 the security light 200 is installed under an eave in a horizontal installation (the security light 100 may be installed in a horizontal installation in a similar manner). The security light 100, 200 in both orientations is adjustable so as to be forwardly directed to properly illuminate an area when turned on regardless of location of installation while also allowing the motion sensor to adequately view a motion sensing zone.

To allow the security light 100, 200 to be mounted in multiple configurations, the security light 100, 200 includes a separated housing mount 102, 202 and luminaire housing 104, 204, which may be removably coupled to each other. Separation of the housing mount 102, 202 and the luminaire housing 104, 204 improves the installation process of the security light 100, 200 and increases variability of installation locations. As can be understood in looking at the figures, direct mounting of a typical wall mount as depicted in FIGS. 1A and 1B to an eave mount as shown in FIG. 2 would not allow both the lamp head(s) and sensors to be properly oriented towards an illumination zone and detection zone. Particularly, by reorienting the luminaire housing against the ceiling/eave without rotational adjustment, the motion sensor field of view would not be oriented appropriately for detection of movement. Also, the lamp heads may be limited in their adjustability due to low clearance of the ceiling structure. However, providing both a separated housing mount in combination with a rotatable first and second portion of a removable security light luminaire housing alleviates such shortcomings.

Typical installation of the security light 100, 200 set forth herein includes initial installation of the housing mount 102, 202 which is electrically connected to an electrical connection within a junction box in some implementations. Separately, the security light luminaire housing 104, 204 is removably attached to the housing mount 102, 202 respectively. The luminaire housing 104, 204 also has both a first portion 106, 206 and a second portion 108, 208, which are rotatable relative to each other, allowing for adjustability as depicted. Separate installation of the housing mount 102, 202 to the fixed structure increases the ease of electrical connection and fixating its position. Further, the housing mount 102, 202 may provide additional and separated functionality, such as modification of the electricity provided by the wired housing/structure to an adjusted low voltage DC provided to the electrical interface between the housing mount and the security light housing. Hence, the housing mount 102, 202 may provide direct and easy mechanical and electrical connection of the luminaire housing 104, 204 once the initial housing mount 102, 202 is installed. Further, the luminaire housing 104, 204 may be rotatably adjusted for proper clearance and aiming of both the motion sensor(s) and lamp head(s). Hence, separating the housing mount 102, 202 from the rotatably adjustable security luminaire housing 104, 204 improves both mechanical installation, electrical connectivity and illumination of the illumination zone.

The separated housing mount 102, 202 is adapted to be affixed to an installation surface (e.g., a wall, an eave, a ceiling, etc.) of a building structure. For example, a base or rear portion 123, 223 of the housing mount 102, 202 may include one or more projections 156, 256, such as a pair of screws (best shown in FIG. 3), for fastening the housing mount 102, 202 to the structure of the eave or the wall. Other examples of fastening elements on the base 123, 223, may include but are not limited to, a bracket, a hanger, a brace, a hook, a closed or open slit, a closed or open slot, or other structure enabling attachment of the base to the wall or eave. Alternatively, the housing mount 102, 202 may simply be affixed to the structural surface.

As shown in FIGS. 1A and 1B, the luminaire housing 104, 204 may include the luminaire housing first portion 106, 206 and the luminaire housing second portion 108, 208 which are rotatably secured together. In some embodiments, the luminaire housing first portion 106, 206 may be further rotatable or slidable relative to the housing mount 102, 202 during installation. For mounting purposes, the first portion 106, 206 may be removably attached to the housing mount 102, 202 respectively, and the second portion 108, 208 is rotatable relative to the first portion 106, 206. For example, a user can rotate the second portion 108, 208 180 degrees relative to the first portion 106, 206 to switch the security light 100, 200 from a horizontal mounting surface as shown in FIGS. 1A and 1B to a vertical mounting surface orientation as shown in FIG. 2. Both embodiments of the security light 100, 200 may be similarly adjusted through rotation about a rotatable hinge 118, 218. By providing a separated housing mount 102, 202 and luminaire housing 104, 204, ease of installation is achieved for the wired electrical connection to the housing mount 102, 202 while allowing separate installation of the luminaire housing 104, 204 directly to a mounting structure containing electrical contacts. Rotatable luminaire housing 104, 204 further allow orientation modifications for redirection of the lamp heads and motion sensors.

The outdoor security light 100, 200 may also include at least one motion sensor or sensor housing 110, 210 and has at least one lamp head 112, 212 rotatably and adjustably located on the luminaire housing 104, 204. In some embodiments, as shown in FIGS. 1A and 1B, the motion sensor 110, 210 may be positioned along a lower section of the luminaire housing 104, 204 and independent from the lamp head 112, 212, so that it may be adjustably positioned relative to the housing and aimed towards high traffic areas or other detection zones. For example, a detection zone may be in front of the installation and lower than an illumination zone. The motion sensor 110, 210 may include at least one sensor and supporting electronics and may also include a lens over the sensor housing opening to properly focalize the input towards the sensor or sensors. Other electronics of the motion sensor may be located within the luminaire housing 104, 204 or the housing mount 102, 202 to properly interpret the input and send appropriate control signals to a luminaire controller or other electronics. More details of the motion sensor 110, 210 will be discussed below.

In some embodiments for the security light 100, 200, the second portion 108, 208 may be connected to the first portion 106, 206 via a rotatable connection that is angularly displaced between the two portions. The rotatable connections may allow rotation of the second portion 108, 208 relative to the first portion 106, 206 so that a user may direct the motion sensor 110, 210 and the light head toward desired locations. For example, the rotational interface between the first portion and the second portion may be along an angled rotational surface or interface 118, 218. In such embodiments, the angled rotational surface or interface 118, 218 is angled relative to a rear mounting plane 130, 230 of the first portion 106, 206. The angled rotational surface 118, 218 between the first portion and the second portion allows the security light apparatus 100, 200 disclosed to be mounted on different surfaces, horizontal or vertical, while allowing the lamp heads and sensor heads to be properly directed outwards toward the illumination and the sensor/detection zone.

The security light 100, 200 allows for multiple installation orientations and includes at least one lamp head 112, 212, which may be adjustably connected to the luminaire housing 104, 204 to adjust the light output or illumination zone. In some embodiments, as shown in FIGS. 1A and 1B, the lamp head 112, 212 may be adjustably mounted onto the luminaire housing second portion 108, 208 via an arm 113, 213. In particular, a first end 111, 211 of the arm 113, 213 may be coupled to the second portion 108, 208, and a second end 115, 215 of the arm 113, 213 that is opposite to the first end 111, 211 may be in different configurations (e.g., a knuckle joint configuration or other suitable adjustable mechanisms) and coupled to the lamp head 112, 212. For example, a knuckle joint shown in FIG. 1A may be used to appropriately adjust the position of the lamp head 112 to allow the lamp head 112 to be variably positioned three dimensionally so that a user may direct light emitted from the security light 100 in various directions as desired. Hence the lamp head(s) which are connected to the luminaire housing may be adjusted along both a first and a second axis and in some implementations the first adjustment axis may be substantially perpendicular to the second adjustment axis.

Figure 4:
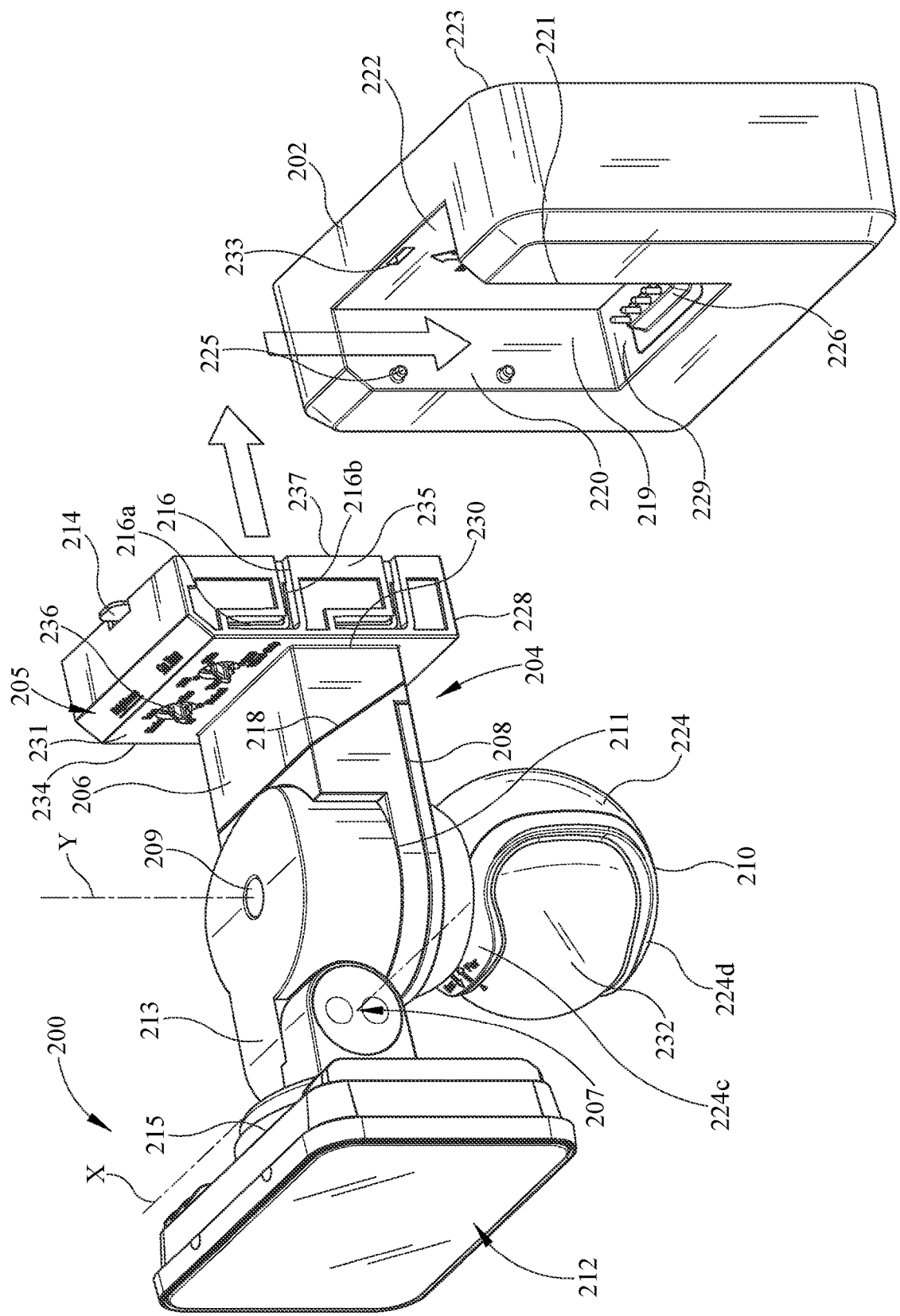
FIG. 4 is a perspective disassembly view of the rotationally adjustable outdoor security light of FIG. 1B with the housing mount separated from the luminaire housing, according to an embodiment of the present disclosure.

Although FIG. 1A describe using knuckle joints at the end 115 for the adjustment of a lamp head 112, it should be understood that other adjusting mechanisms (e.g., a multi-axis hinge) may also be used to couple the lamp head 112 to the luminaire housing second portion 108. For example, FIG. 2 illustrates a configuration with two lamp heads 112, where the first lamp head 112A and the second lamp head 112B are each rotationally attached to the luminaire housing second portion 108 by a respective first and second rotational hinge 107 and 109. As shown in FIG. 2, the first rotational hinge 107 may rotate about a first rotation axis X while the second rotational hinge 109 may rotate about a second rotation axis Y, and the first rotation axis X may be perpendicular to the second rotation axis Y. In some other embodiments for the security light 200, FIG. 4 illustrates a configuration with a single lamp head 212 is rotationally attached to the luminaire housing second portion 208 by a respective first and second rotational hinge 207 and 209. As shown in FIG. 4, the first rotational hinge 207 may rotate about a first rotation axis X while the second rotational hinge 209 may rotate about a second rotation axis Y, and the first rotation axis X may be perpendicular to the second rotation axis Y in some embodiments. Although FIGS. 2 and 4 describe using a multi-axis hinge adjustable arm for the adjustment of a lamp head 112, 212, it should be understood that other adjusting mechanisms may also be used to couple the lamp head 112, 212 to the luminaire housing second portion 108, 208. It should be understood that even further embodiments may allow for a separated lamp head remote from the luminaire housing 104, 204 and connected thereto by an electrical connection to power and control the illumination sources. For example, a separate lamp head may be individually mounted on a supporting structure by mechanical or magnetic means and be electrically connected to the luminaire housing 104, 204 for electrical connectivity. It should be also understood that the number of lamp heads is not limited here. For example, in some embodiments, two or more lamp heads may be connected to the luminaire housing second portion 108, 208 for brighter illumination.

As well, it should be understood that while a single lamp head is shown in some embodiments, multiple lamp heads may be provided with similar adjustability mechanisms so that each of the plurality of lamp heads are independently adjustable about multiple axis.

The security light 100, 200 may be adjusted to be operable, such as being well-suited for an eave-mounted, wall-mounted, ceiling-mounted, and/or freestanding security light. Further, alternative power sources may be configured for the electricity needed for operation. In some embodiments, the security light 100, 200 may be adapted for connection to a wired external power source, such as the junction box with a 110V or 220V line voltage electrical service, a remote solar charging station with rechargeable batteries, and/or one or more internal batteries. For example, in some embodiments, electrical wiring cables within the junction box may be connected to an electrical connector 140, 240 of the housing mount 102, 202 to provide a wired line voltage electrical connection to the security light 100, 200 and the embedded electronic components. In some embodiments, the electrical connector 140, 240 may be a quick connector configured to be connected to Romex wires (the 110V AC hot, neutral, and ground wires) from a junction box.

Figure 3:
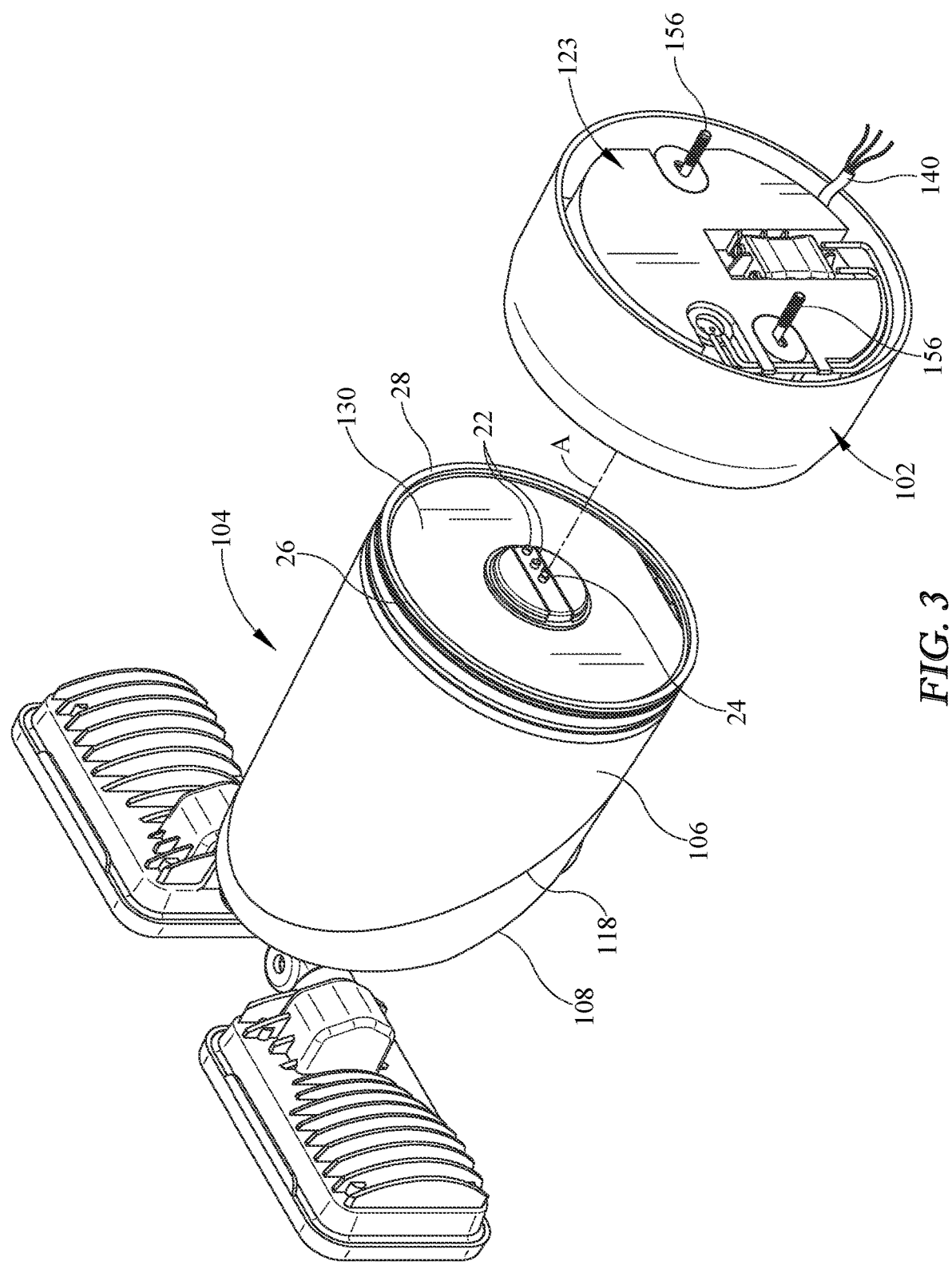
FIG. 3 is a rear perspective view of the rotationally adjustable outdoor security light of FIG. 1A with the housing mount separated from the luminaire housing, according to an embodiment of the present disclosure.

As shown in FIGS. 3 and 4, the electrical power may be provided to the security light 100, 200 via electrical low voltage contacts between the housing mount 102, 202 and the luminaire housing 104, 204, thereby allowing the luminaire housing to be wired without additional hard wiring as is typical. For example, the electrical contact between the first portion 106, 206 and the housing mount 102, 202 may be quick connect low voltage electrical contacts. When assembled, the luminaire housing 104, 204 may rotate and/or slide relative to the installed orientation of the housing mount 102, 202. In some embodiments, a rotatable electrical connection as shown in FIG. 3 may allow the initial orientation of the junction box and/or the housing mount 102 to not limit the orientation of the motion sensor 110 and the lamp head 112. That is to say that the security light 100, in one of the many implementations, is always electrically coupled regardless of the rotational orientation between the luminaire housing 104 relative to the housing mount 102. In implementations, the electrical connection between the housing mount 102 and luminaire housing 104 includes ground, neutral, and hot connections. In some implementations, these connections may be maintained for up to about 360 degrees of rotation or less (e.g. CW and/or CCW) about an axis A as shown in FIG. 3. Electricity for the security light 100 is supplied through the rotational quick connect construction providing low voltage DC to the security light. In some installations, the luminaire housing 104 of the security light 100 initially attaches to the housing mount 102 at an offset angle between the two structures allowing rotation to be a part of the installation. For example, installation may require rotation of the luminaire housing relative to the housing mount 102 by 20-40 degrees before the two structures are in a final locked orientation. In some embodiments, rotational electrical connection may be a full 360 degrees. In other implementations, the rotational electrical connection may be less, for example between 90 and 180 degrees. In some implementations, the rotation between the two structures acts to mechanically lock the structures together. For example, helical threads on both structures may be used to properly orient and lock the two structures together. In still further examples, there may be a direct connection between the housing mount 102, 202 and the luminaire housing 104, 204, which does not require rotational adjustment. For example, the luminaire housing 104. 204 may snap fit, friction fit or be installed in the proper orientation to the housing mount 102, 202.

In some embodiments as shown in FIG. 3, the rotational electrical contacts between the housing mount 102 and the luminaire housing 104 may be concentric contacts located on respective receiving interfacing surfaces of the two components. When the two components are in a mounted contacting position, the contacts may be aligned to corresponding opposing contacts on the receiving surface, allowing the power to be exchanged between the contacts. As shown in FIG. 3, electrical contacts or connections 22 between the housing mount 102 and the luminaire housing 104 may be rotatably electrically engaged during the rotation (e.g. in the plurality of rotational orientations of the luminaire housing 104 in respect to the housing mount 102). The one or more electrical contacts 22 of the luminaire housing 104 may have rotational contact with the one or more respective electrical contacts of the housing mount 102 (not visible here). The one or more electrical contacts 22 of the luminaire housing 104 rotates with the luminaire housing 104 and maintains the contact (e.g. axial and/or radial contact, etc. for 360 degrees contact about the axis A) with the fixed connections of the housing mount 102. Stated alternatively, the one or more engaging contacts 22 may be rotationally held in electrical contact with the other corresponding contacts at the housing mount 102 during any point of the rotation. Thus, in some embodiments, the rotatable luminaire housing 104 may be in rotational connection with the housing mount 102 wherein electrical connectivity between the light luminaire housing 104 and the housing mount 102 is maintained during all points of rotation. In other embodiments, rotational connectivity may be maintained only during a predefined rotational extent wherein the luminaire housing 104 is energized at recognized rotational points relative to the housing mount 102 while at other points during the rotational extent relative to the two the electrical connections may be interrupted. Similar aspects and features may be implemented in a rotatable electrical plug connection as well.

For example, in the embodiment shown in FIG. 3, the luminaire housing 104 may include a first and second rearwardly projecting electrical contacts 22 in a tensioned leaf spring or brush configuration, engaging the electrical contacts in a concentric annular ring configuration (e.g. hot and neutral) of the housing mount 102. The contacts may include a centrally located coil spring 24 for ground with a corresponding centrally located disc of the housing mount 102. In such embodiments, the first and second rearwardly projecting electrical contact 22 may maintain electrical connectivity to the energized concentric annular rings during the entire rotational extent of the luminaire housing 104 relative to the housing mount 102 while the rings are continually in electrical connectivity to respective hot, neutral, and ground wiring from the junction box. In some embodiments, one or more structures of the luminaire housing 104 and/or the housing mount 102 may axially and/or rotationally engage each other to allow relative rotation and/or energizing of the security light 100. Alternatively, or in combination with the light fixture structure, the user may need to axially and/or rotationally maintain the luminaire housing 104 with the housing mount 102 until the rotational orientation is fixed. For example, with the luminaire housing 104 assembled with the housing mount 102, the electrical contacts 22 may be engaged/energized.

In some embodiments as shown in FIG. 3, one or more structures of the luminaire housing 104 and/or the housing mount 102 may axially and/or rotationally engage each other to allow relative rotation and/or energizing of the security light 100. Alternatively, or in combination with the light fixture structure, the user may need to axially and/or rotationally maintain the luminaire housing 104 with the housing mount 102 until the rotational orientation is fixed. For example, with the luminaire housing 104 assembled with the housing mount 102, the electrical contact 22 may be engaged/energized. In some embodiments, one or more retention members (e.g. lugs, taps, projections, dimples) may be used to axially retain the luminaire housing 104 with the housing mount 102. The retention member may also allow for relative rotation between the luminaire housing 104 and the housing mount 102. The retention member may be received within one or more receivers 26 located on a skirt 28 of the luminaire housing 104.

In some other embodiments, the security light 200 may have a different mechanical and electrical engaging manner compared with the security light 100 as described above. For example, FIG. 4 is a perspective disassembly view of the security light 200 showing a state before the luminaire housing 204 is attached to the housing mount 202. As shown here, in some embodiments, the luminaire housing 204 may be attachable to and detachable from the housing mount 202 in a sliding manner, such that when the luminaire housing 204 has been attached, electrical contacts such as positive and negative terminals (e.g., power pins and power receptacle as shown here) of the luminaire housing 204 and the housing mount 202 are brought into alignment and contact with each other. For example, as shown in FIG. 4, the first portion 206 of the luminaire housing 204 may include a mounting block 205, and attaching of the luminaire housing 204 to the housing mount 202 is performed by sliding the mounting block 205 down in the housing mount 202 to lock luminaire housing 204. Accordingly, detaching of the luminaire housing 204 may be performed by operating above actions in a reverse manner (i.e., sliding the mounting block 205 up from the housing mount 202 and pulling back therefrom).

As described above, in some embodiments, the mounting block 205 provided at an end of the first portion 206 of the luminaire housing 204 is removably engaged (e.g., slidably attached) to the housing mount 202 of the security light 200 so as to be attached and detached via a receiving opening 219. In such embodiments, as shown in FIG. 4, the receiving opening 219 formed in front of the housing mount 202 may include a first side surface 220, a second side surface 221, and an engaging surface 222. The mounting block 205 may include a front wall 231, a rear wall 237, and the first and second side walls 234 and 235, which are formed at both sides of the mounting block 205. In some embodiments, a control panel 236 including one or more control functions such as a timer adjustment, a brightness adjuster may be located on the front wall 231 of the mounting block 205, direction and other control may be implemented through a lighting controller or through the LED drivers or other similar electronics.

In some embodiments, both the first and second side walls 234 and 235 of the mounting block 205 may be provided with one or more sliding slots 216 thereon to pair with one or more sliding protrusions 225 respectively formed on the first and second side surfaces 220 and 221 of the housing mount 202 for guiding and locking the mounting block 205 in place during the installation process. In some embodiments, the sliding slot 216 may include a first, vertical sliding portion 216a and a second, horizontal sliding portion 216b to align and guide the installation direction as described above and indicated by the arrows as shown in FIG. 4. The configuration (e.g., the shape, height, etc.) of the sliding slots 216 and the sliding protrusions 225 may be formed to such extent that the sliding protrusion 225 is able to be firmly engaged within the sliding slot 216 when the mounting block 205 is slid into the housing mount 202. It should be noted that the location and/or configurations of the sliding slot 216 and the paired sliding protrusion 225 are not limited here. For example, in some embodiments, the locations of the sliding slot 216 and the paired sliding protrusion 225 as shown in FIG. 4 may be exchanged (i.e., the sliding slot 216 is located on the first and second side surfaces 220 and 221 of the housing mount 202 while the sliding protrusion 225 is located on the first and second side walls 234 and 235 of the mounting block 205).

In some embodiments, besides the sliding slot 216 and the sliding protrusion 225, one or more locking, aligning or safety mechanisms may also be provided for additional alignment and restraining of the mounting block 205 within the housing mount 202. For example, in some embodiments, an elastic body lock 214 may be provided on the rear wall 237 of the mounting block 205 with a pressed locking mechanism including a hook configured to be locked into and unlocked from a lock receiving opening 233 on the engaging surface 222 of the housing mount 202. For example, the lock 214 and the lock receiving opening 233 configured to be engaged with the lock 214 in a sliding direction may be formed at an upper end portion of the rear wall 237 of the mounting block 205 and the engaging surface 222 of the housing mount 202 respectively. It should be noted that the location and/or configurations of the lock 214 and the lock receiving opening 233 are not limited as depicted in the figures. For example, in some embodiments, the locations of the lock 214 and the lock receiving opening 233 as shown in FIG. 4 may be exchanged (i.e., the lock 214 is located on the engaging surface 222 of the housing mount 202, while the lock receiving opening 233 is located on the rear wall 237 of the mounting block 205). In some other embodiments, the lock 214 and the corresponding lock receiving opening 233 may be located at one or both side surfaces/walls of the housing mount 202 and/or the mounting block 205. With the pressed locking mechanism (e.g., the elastic body lock 214), the detaching of the luminaire housing 204 may be performed by pressing the lock 214 thereby to release the locking mechanism between the mounting block 205 and the housing mount 202. It should be understood that although the lock 214 shown here is so constructed that the operation parts are pressed inward to unlock the hook in the above described embodiments, some other suitable lock operation manners may also be adopted here. For example, the lock parts may be provided with taper faces, and the lock may be locked/unlocked by sliding.

As shown in FIG. 4, the housing mount 202 and the mounting block 205 may include interfacing electrical contact connections 226. The luminaire housing 204 may be electrically engaged during the installation (e.g. with the sliding motion of the mounting block 205 in respect to the housing mount 202 as described above). For example, in the embodiment shown in FIG. 4, the housing mount 202 may include a plurality of upwardly projecting electrical contact connections 226 in a pin configuration located on an electrical receiving surface 229 within the receiving opening 219, capable of engaging the electrical contact connection in an electrical receptacle configuration located on an electrical connecting surface 228 of the mounting block 205 (not visible in the figures) of the first portion 206 of the luminaire housing 204. Thus, the electrical contact connection of the luminaire housing 204 sliding with the mounting block 205 may maintain electrical connection with the fixed electrical connection 226 of the housing mount 202 in a pin and receptacle configuration. Accordingly, the first, vertical sliding portion 216a as shown in FIG. 4 may be configured to align/guide the mounting block 205 to slide far enough vertically to allow the electrical contact connections 226 to be in full electrical contact for power supply.

Thus, in the embodiment as shown in FIG. 4, for attaching the luminaire housing 204 to the housing mount 202 of the security light 200 fixed on an eave or a side wall, the sliding slot 216 of the mounting block 205 are slid into and engaged with the sliding protrusion 225 of the housing mount 202 by pushing and sliding down as indicated by the arrows in FIG. 4. When the mounting block 205 has been pushed in and slid to the end having the electrical receiving surface 229 of the housing mount 202, the lock 214 of the mounting block 205 may enter into the lock receiving opening 233 of the housing mount 202 to be locked automatically, whereby the luminaire housing 204 can be reliably attached to the fixed housing mount 202. For detaching the luminaire housing 204 from the housing mount 202, the lock 214 may be pressed inward to release the engagement from the lock receive opening 233, then the mounting block 205 may be slid in an opposite direction thereby to be detached from the fixed housing mount 202.

Figure 5B:
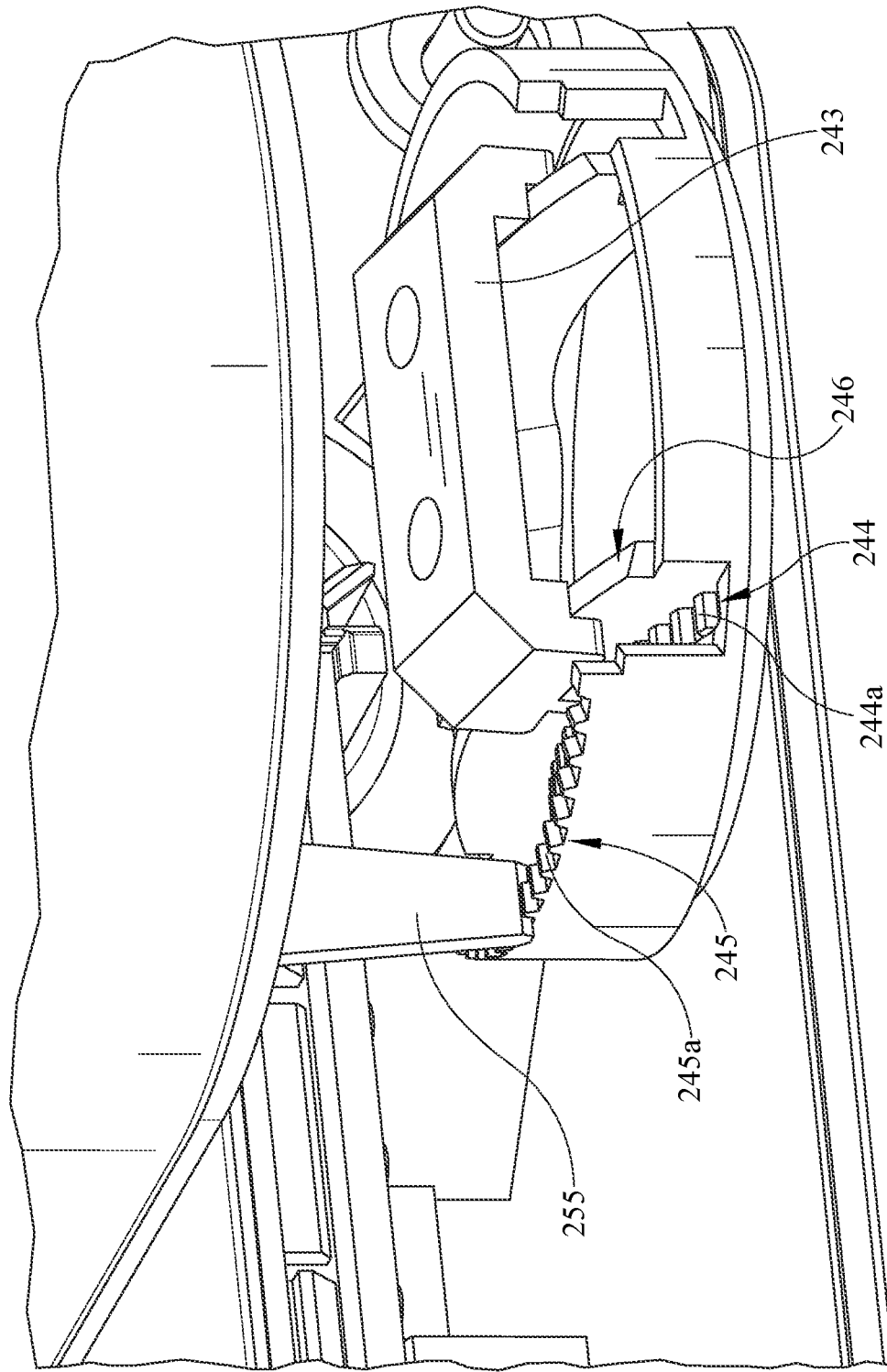
Figure 5C:
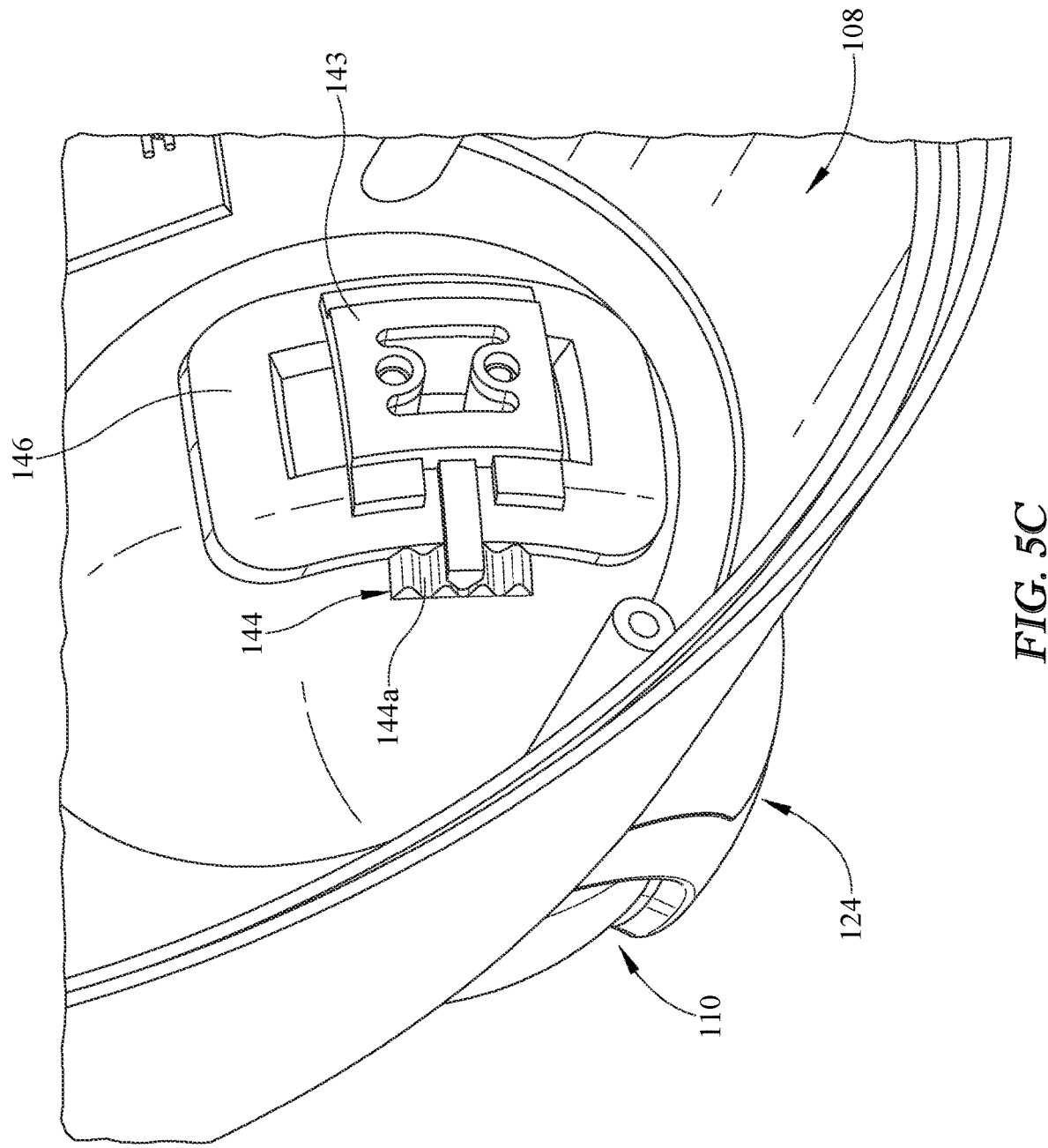

In some embodiments, the spherical motion sensor housing 110, 210 may be rotatable/adjustable against the mounting structure (e.g., the luminaire housing first or second portion 106, 206 and/or 108, 208) and/or the sensor shroud 124, 224. FIGS. 5, 5A, 5B, and 5C illustrate various adjusting mechanisms for the motion sensor 110, 210 in different embodiments. For example, in some embodiments, the motion sensor 110 may be capable of a single-axis rotation/adjustment (e.g., vertical tilting) as shown in FIG. 5C. In such embodiments, an interfacing tab 143 may be attached to the rear of the shroud 124 of the motion sensor 110 and be supported and guided by a supporting cup or rail 146 mounted interior of the luminaire housing second portion 108 for coupling and retaining the spherical motion sensor housing 110 with the interfacing tab 143 to the luminaire housing second portion 108. The interfacing tab 143 may be configured to mate with a plurality of interfacing notches 144a included on a first gear rack 144. In some embodiments, the first gear rack 144 may be in a linear configuration and mounted interior of the luminaire housing second portion 108, so that a tactile horizontal adjustment of the motion sensor 110 may be achieved by manually tilting the shroud 124 of the spherical motion sensor housing 110 as shown in FIG. 5C. It should be understood that the adjustment may be limited by the number of notches 144a, the length/configuration of the first gear rack 144, and the configuration of the supporting cup 146, etc.

Figure 7A:
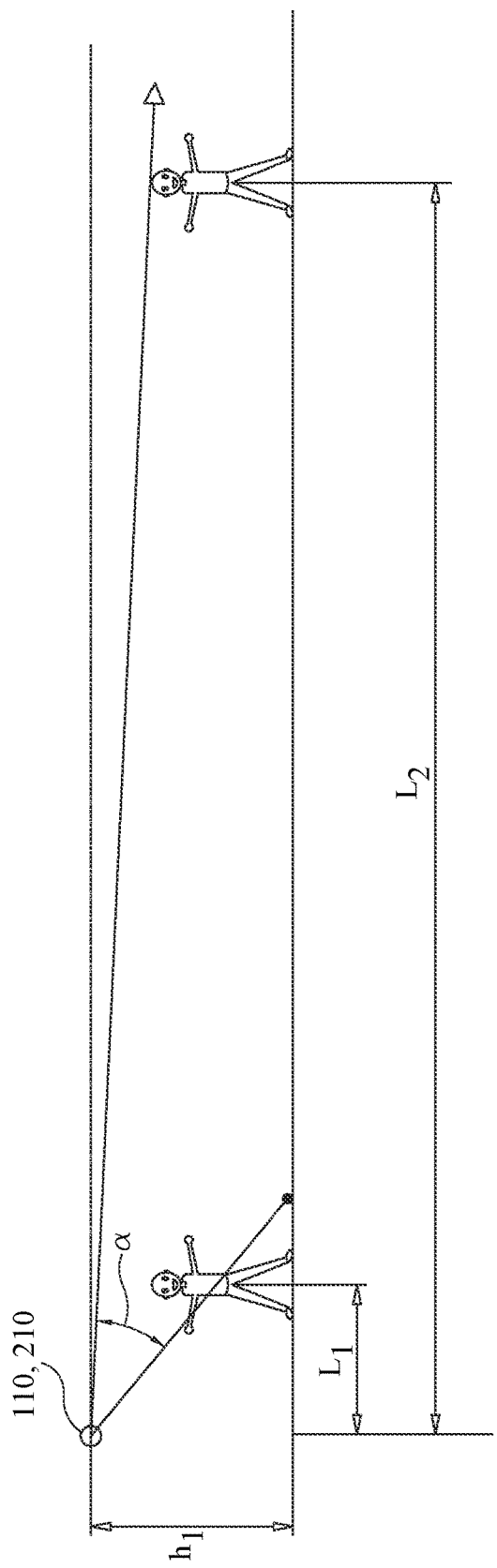
FIG. 7A and FIG. 7B illustrate two different detection ranges that can be achieved with an adjustable spherical motion sensor, according to an embodiment of the present disclosure.
Figure 7B:
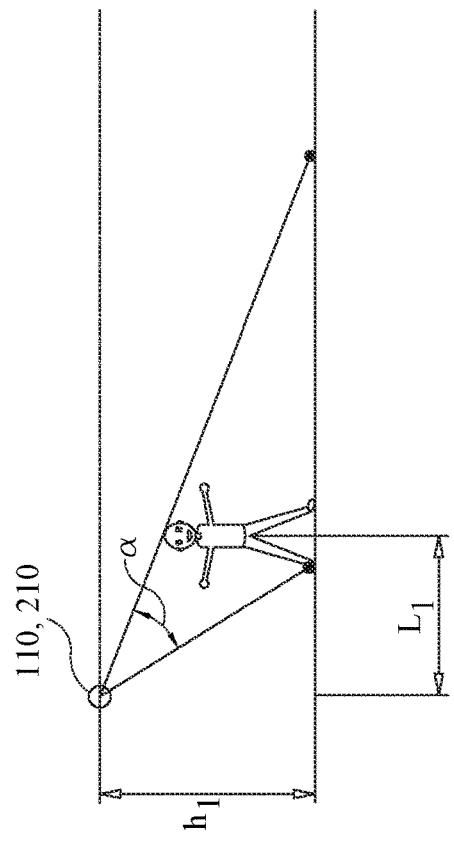

In some other embodiments, the spherical motion sensor housing may have a two-axis rotation/adjustment with the sensor shroud. In some such embodiments, the two-axis of rotation/adjustment may be along substantially perpendicular axis. For example, as shown in FIGS. 5 and 5A-B, the motion detection range and/or the field of view (FOV) of the motion sensor may be adjusted vertically (e.g., a first axis adjustment) by tilting the motion sensor on a vertical plane such as up or down (e.g., a far range may be achieved by tilting the sensor 110, 210 up, and a near range may be achieved by tilting the sensor 110, 210 down as indicated in FIGS. 7A and 7B). The motion sensor 110, 210 may also be adjusted horizontally on a horizontal plane (e.g., a second axis adjustment). In such embodiments, the up-down and/or left-right adjustment may be limited by abutting one or more structures (e.g., an outwardly directed tab) against one or more stops to prevent over-rotation.

For example, FIGS. 5, 5A, and 5B illustrate an exemplary adjustment mechanism of the spherical motion sensor housing 210 that the entire motion sensor is adapted to rotate to undergo the first and second axis adjustment (e.g., pivoting and panning motion) as indicated above. In some embodiments, one or more interfacing tabs combined with one or more gear racks may be attached to the motion sensor such that the entire motion sensor housing is able to rotate about first and second orthogonal axes, respectively. For example, in some embodiments, within a supporting cup 246 retained within the luminaire housing second portion 208, an outwardly directed projection 241 may be located on the supporting cup 246, a first stop 242a and a second stop 242b may be located on a convex surface of the luminaire housing second portion 208, a first interfacing tab 243 may be attached to the spherical motion sensor housing 210, and a first gear rack 244 including a plurality of first negative notches 244a for mating with the first interfacing tab 243 in different positions may be provided on the supporting cup 246. Accordingly, in such embodiments, the horizontal adjustment may be limited by the projection 241 abutting against the first stop 242a and/or the second stop 242b (e.g., the range of horizontal motion may be limited within 34 degrees left and 34 degrees right from the center, for example), and the vertical adjustment may be limited by the tactile positions between the first interfacing tab 243 and the plurality of first negative notches 244a on the first gear rack 244.

In some embodiments, a second gear rack 245 including a plurality of second negative notches 245a for mating with a second interfacing tab 255 (as shown in FIG. 5B) may be provided on the supporting cup 246 for the horizontal adjustment of the motion sensor 210. In such embodiments, the second interfacing tab 255 may be located on a portion (e.g., a rotational assembly) of the luminaire housing 204 to allow the supporting cup 246 to rotate around the second axis as indicated by the arrows in FIG. 5A to provide a tactile horizontal adjustment of the motion sensor 210. In some embodiments, the first interface tab 143, 243 may be located on the second shroud hemisphere 124b, 224b (at the top or at the rear portion of the second shroud hemisphere 224b as shown in FIGS. 1A and 1B) including a moving tab plate 143a, 243a, and the first interface tab 143, 243 may be coupled to the second shroud hemisphere 124b, 224b via a stem 143b, 243b incorporating a pin-slot mechanism, or any other attachment mechanisms such as pop rivet. In different embodiments, the configuration of the first interface tab 143, 243 may vary. For example, in some embodiments, the first interface tab 143 may be in an approximate "T" shape as shown in FIG. 5C, and in some other embodiments, the first interface tab 243 may be in an approximate sliding plate configuration as shown in FIG. 5B.

In some embodiments as shown in FIGS. 5A and 5B, the plurality of first interfacing notches 244a of the first gear rack 244 may be provided on an arcuate or inclined surface for the vertical adjustment, while the plurality of second interfacing notches 245a of the second gear rack 245 may be provided on a flat/level surface for the tactile horizontal adjustment of the motion sensor 210. Various other adjustment mechanisms are also available such as standard ball and knuckle connections, two axis elbow connections and the like. It should be understood that a smooth adjustment without using the interfacing notches may also be adapted here as desired, for example, using a gear rack and pinion mechanism.

In some other embodiments, instead of being affixed directly to the luminaire housing 104, 204 as shown here, the motion sensor 110, 210 may also be remote therefrom and may be connected to the security light 100, 200 either by a wired or a wireless connection. For example, the motion sensor 110, 210 may communicate with the security light 100, 200 from a remote location and provide a signal indicating detected motion. Such technology may include heat signatures, range finding and/or distance measurement algorithms and other techniques which may be electronically implemented in the motion sensor 110, 210, combined with electronics within the luminaire housing 104, 204.

Figure 6:
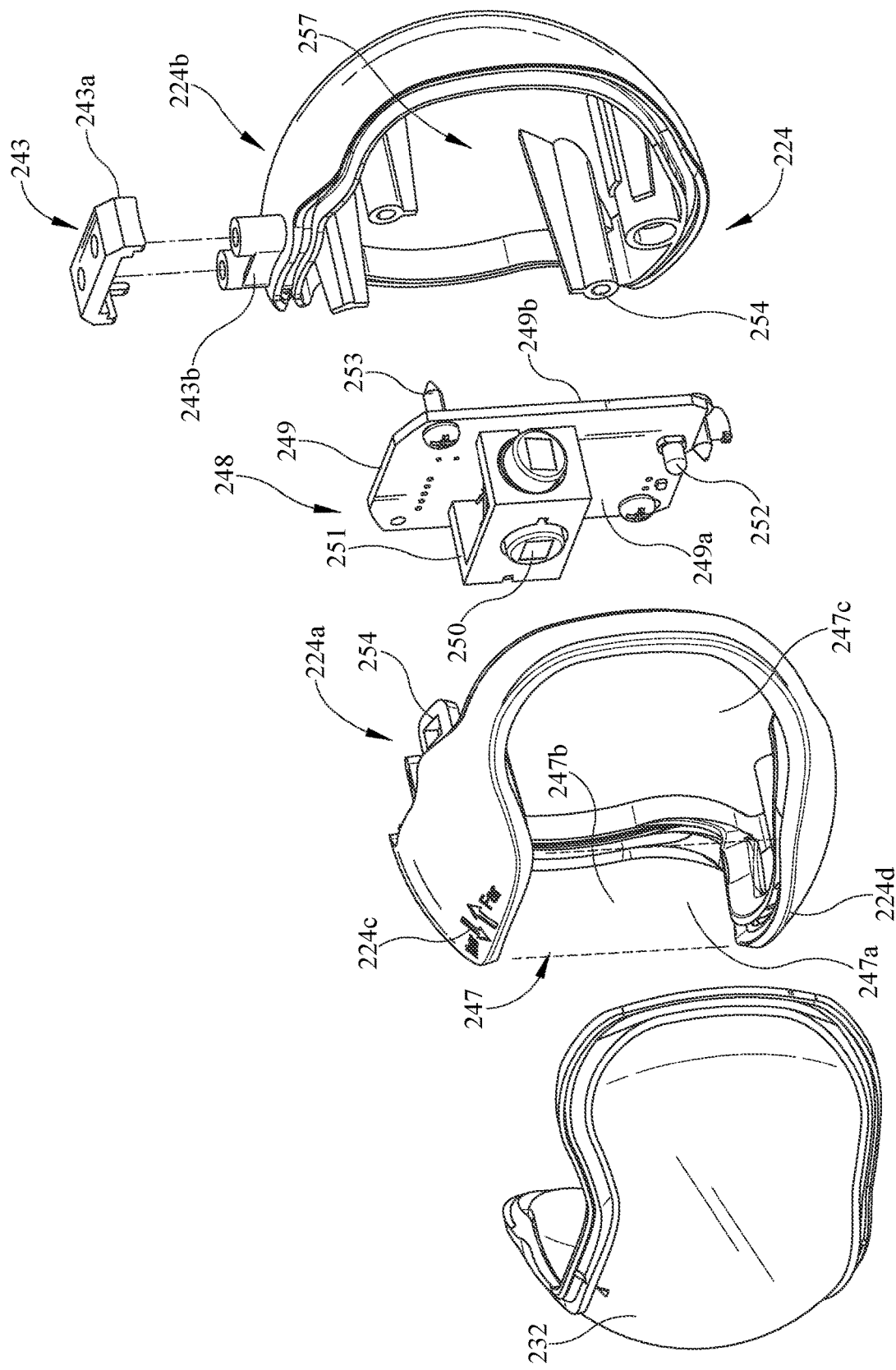
FIG. 6 is a an exploded, perspective view of an adjustable spherical motion sensor housing, according to an embodiment of the present disclosure.

FIG. 6 is an exploded view of one example for the components within the spherical motion sensor housing 210 (the motion sensor 110 has a similar configuration except the location of the interfacing tab 143 for adjustment is located on the rear instead of at the top of the housing). As shown here, the motion sensor 210 may include a spherical shroud 224, a lens 232, and a motion detection unit 248 mounted within the spherical shroud 224. The shroud 124, 224 may comprises abutting non-light-transmissive a first shroud hemisphere shell 124a, 224a and a second shroud hemisphere shell 124b, 224b, which together form the hollow sphere shroud 124, 224, which substantially totally surrounds the motion detection unit 248. The first and second shroud hemisphere 124a, 224a and 124b, 224b are held in abutting relationship by connecting the shells, via various fastening mechanisms, such as pin and slot and/or snap clip mechanism 254 as shown in FIG. 6. In some embodiments, the adjustable sensor shroud 124, 224 may be configured to support, and at least partially house the spherical motion sensor housing 110, 210. In some embodiments, the adjustable sensor shroud 124, 224 may automatically adjust (e.g., by gravity) in various configurations to position properly for the operation of the motion sensor. In still further embodiments, the shroud 124, 224 may be combined from more than first and second hemisphere portions as the example shown in the drawings are exemplary only.

The motion detection unit 248 has an optical field of view for motion detection through a lens opening 247 located on the first shroud hemisphere 224a, and the lens 232 may be configured to cover the lens opening 247 of the spherical shroud 224. The optical field of view for motion detection includes a horizontal field of view and a vertical field of view. To increase the lateral or horizontal field of view, in some embodiments, the lens opening 247 may be defined by a center opening portion 247a, a first horizontal extent opening portion 247b, and a second horizontal extent opening portion 247c. In some embodiments, the center opening portion of the spherical shroud has a left periphery and a right periphery (the two dashed lines in the opening 247 as shown in FIG. 6), and the first horizontal extent opening portion 247b abuts the center opening portion left periphery and the second horizontal extent opening portion 247c abuts the center opening portion right periphery.

In some embodiments, the first shroud hemisphere 224*a* may also include a first occluding portion 224*c* and a second occluding portion 224*d*, which may limit the upper and lower vertical field of view. Depending on the installation position, in some embodiments, the sensor shroud 124, 224 combined with the first occluding portion 224*c*, the second occluding portion 224*d*, the first horizontal extent opening portion 247*b*, and the second horizontal extent opening portion 247*c* may provide a horizontal field of view ranging from about 200 degrees to about 240 degrees or more and a vertical field of view ranging from about 20 degrees to about 40 degrees or less. It should be understand that the motion detector detects motion only within its field of view. That is, motion detector with a vertical field view of up to about 40 degrees is able to sense motion within a range falling under a vertical field of view of about 40 degrees. In some embodiments, each of the first occluding portion 124*c*, 224*c* and the second occluding portion 124*d*, 224*d* may be a tab with a curved surface as shown in FIG. 6.

In some embodiments, the spherical motion sensor housing 110, 210 may incorporate the use of multiple or single mounted passive infrared sensor (PIR), pyroelectric infrared radial (PR) sensor, radar, sonic and/or laser range finding, among various technologies known to electronically determine movement of people and/or animals. As existing PIR motion sensors have a fixed field of view, multiple PIR sensors facing different directions may be provided to provide an enlarged field of view in some embodiments. For example, in some embodiments, the motion detection unit 248 may include a structure, such as a mounting block 251 with a plurality of carrying surfaces, on which a plurality of thermal radiation sensors 250 (e.g., PIR sensor) may be mounted. In some embodiments, a plurality of sensors 250 (e.g., a first, second and third PIR sensors as shown in FIG. 6) may be arranged at an angle as shown to face the front and both sides of the motion sensor (e.g., face the center opening portion 247*a*, the first horizontal extent opening portion 247*b*, and the second horizontal extent opening portion 247*c*, respectively). It should be understood that other suitable arrangements may also be adopted, and more or fewer than three sensors may be used. Further, each of the PIR sensors may be electrically connected to a lighting controller which reads the sensed input and acts accordingly depending on current security light settings.

In some embodiments, the motion detection unit 248 may also include a mounting surface 249, such as a printed circuit board assembly as shown in FIG. 6. In such embodiments, the printed circuit board assembly may include a first circuit board surface 249*a* and a second circuit board surface 249*b*, and the mounting block 251 holding one or more sensors 250 may simply be affixed to the first surface 249*a* via glue, adhesive pads, or other suitable mechanisms. In some embodiments, the mounting surface 249 may be mounted internally within the spherical shroud 224 to a rear portion 257 of the second shroud hemisphere 224*b* through at least one fastener, such as one or more screws 253. In some embodiments, the motion detection unit 248 may be mounted within the spherical shroud 224 proximal to the rear portion 257 of the spherical shroud 224 and distal from the lens 232 as shown in FIG. 6. In some embodiments, at least one LED indicator light 252 may be also provided on the mounting surface 249 to inform the user of the operation of the motion detector in detecting movement/heat.

While PIR sensors are depicted within the sensor shroud herein, it is understood that many different types of motion sensors may be included such as non-heat based sensors, vision sensors/circuits, radar or other circuitry which detects movement within a field of view. The output of any of these different types of motion sensors may be provided to the lighting controller for reading and subsequent determination of response by the security light.

In some embodiments, the lens 132, 232 may be flexible plastic lens (e.g., flexible segmented Fresnel lens), enabling a more compact spherical design. For example, the lens 132, 232 may be a flexible plastic lens formed from a thin flexible sheet of plastic material, on which are formed a number of individual Fresnel lens segments or lenslets. In some embodiments, the lens may also be pre-formed to a particular shape. For example, the lens 132, 232 may be curved to the desired angle or shape, such as a partial spherical arc as shown in FIG. 6, or curved around the circumference of the opening of the spherical shroud 124, 224 for fully coverage. For PIR sensors, the lens 132, 232 may be configured to pass infrared wavelength radiation for the purpose of motion detection. In some embodiments, the light-transmissive lens 132, 232 may be a segmented Fresnel lens to focalize signal inputs towards the one or more PIR or other type sensors and also to protect electronics inside, and through which the motion sensor can detect motion. In some other embodiments, the lens 132, 232 may be a plain sheet of translucent or transparent polymer, and/or other similar structures to focus light and/or radiation to the opening allowing input to the PIR sensor electronics, and the lens 132, 232 may be configured in any other curved arc and having a plurality of Fresnel lenses formed. For example, in some embodiments, the lens 132, 232 may be made of a light-transmissive material, such as a clear acrylic, and curved in a conical or convex shape to focus infrared radiation over a desired field of view so as to permit the sensor to function optimally through the lens. In some embodiments, the lens may be a transparent or translucent bulb type housing. It should be understood that the lens may be of many other suitable shapes/configuration/materials, such as parabolic, cylindrical, glass, etc.

It should be understood that other motion detection technologies may be adapted here instead of PIR. For example, in some embodiments, the motion sensor 110, 210 may be a capacitive sensor that utilizes a heatsink of the security light 100, 200 and/or a transparent patch of indium tin oxide (ITO) on an outer surface of security light 100, 200 as a key. Also, for example, in some embodiments, the motion sensor 110, 210 may be an ultra-sonic Doppler transmitter and receiver that uses time of flight techniques to determine distance to an object. Also, for example, in some embodiments, the motion sensor 110, 210 may be a radar transmitter and receiver that uses time of flight techniques to determine distance to an object. Also, for example, in some embodiments, the motion sensor 110, 210 may be an infra-red reflection distance sensor receiver that measures distance to an object. Also, for example, in some embodiments, the motion sensor 110, 210 may be a PIR that detects a heat source (such as a user's hand). Also, for example, in some embodiments, the motion sensor 110, 210 may be light reflection sensor that detects presence and/or distance of an object based on reflections of light output of the security light 100, 200. Also, for example, in some embodiments, the motion sensor 110, 210 may be a camera and one or more signals from the camera may be utilized to detect presence and/or distance of an object. For example, signals from a depth camera may be utilized to determine an object in the shape of a person or vehicle is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments a proximity sensor may include one or more controllers to determine presence, distance, and/or other values.

FIGS. 7A and 7B illustrate two different detection ranges or view cones corresponding to two motion sensor adjustment settings (e.g., a far detection range and a near detection range). FIG. 7A illustrates a far detection range with a detection angle α, with the motion sensor 110, 210 mounted at a height h1 (e.g., 8 feet from the ground). Accordingly, the motion sensor 110, 210 may be able to sense motion from an object (e.g., a person) between a range at a near distance L1 (e.g., 6 feet horizontally from the sensor) and at a far distance L2 (e.g., 50 feet horizontally from the sensor). As described previously, sometimes the detection range may be too large or too small in a given setting. For example, when the outdoor security light with the motion sensor 110, 210 is affixed to an exterior wall or a garage door of a house, the motion detector may detect motion both within the user's own yard and also motion that occurs in a next door neighbor's yard with the far detection range setting as shown in FIG. 7A. With the disclosed security light motion sensor design here, the user is able to adjust the detection range to a near detection range setting by tilting down the motion sensor, for example, only cover an object within the near distance L1 range (e.g., 6 feet horizontally from the sensor) as shown in FIG. 7B, to exclude motion in the neighbor's yard from detection. Conversely, the user may also increase the detection range by tilting the motion sensor up. It is to be understood that the detection angle α does not change during the vertical orientation adjustment of the sensor.

It is to be understood that a rotationally adjustable outdoor security light with an adjustable spherical motion sensor housing disclosed here is not limited in its application to the details of construction and the arrangement of components set forth in the following description or illustrated in the drawings. The described embodiments are capable of other embodiments and of being practiced or of being carried out in various ways. That is, the structure of the rotationally adjustable outdoor security light with the adjustable spherical motion sensor housing as shown here is presented for purpose of illustration and description only. It is understood that numerous modifications and alterations of the structure of the rotationally adjustable outdoor security light with the adjustable spherical motion sensor housing may be made while retaining the teachings of the present disclosure. Consequently, the disclosed rotationally adjustable outdoor security light with the adjustable spherical motion sensor housing may be installed in various environments. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings. It should be understood that the rotationally adjustable mechanism could vary greatly and still accomplish the same intent. The elements depicted in the accompanying figures may include additional components and that some of the components described in those figures may be removed and/or modified without departing from scopes of the elements disclosed herein. The elements depicted in the figures may not be drawn to scale and thus, the elements may have different sizes and/or configurations other than as shown in the figures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A security light having an adjustable spherical motion sensor, comprising:
   a luminaire housing including at least one lamp head, a mounting portion, and a support;
   a spherical shroud, wherein the shroud has a lens opening;
   a rotation limiter extending from the spherical shroud and received within the luminaire housing, the spherical shroud rotatable relative to the luminaire housing along a first rotation axis and a second rotation axis;
   the rotation limiter interfacing at least one rotational stop in the luminaire housing for restricted rotation along the first rotation axis;
   a lens covering the lens opening of the spherical shroud and generating a horizontal field of view;
   a motion detection unit mounted within the spherical shroud and behind the lens, the motion detection unit having an optical field of view for motion detection through the lens; and
   wherein the motion detection unit has a motion detection horizontal field of view through the lens of at least 200 degrees.

2. The security light of claim 1, wherein the first rotation axis of the spherical shroud is substantially perpendicular to the second rotation axis of the spherical shroud.

3. The security light of claim 1, wherein the motion detection unit having a capacitive sensor.

4. The security light of claim 1, wherein the motion detection unit having an ultra-sonic doppler transmitter and receiver.

5. The security light of claim 1, wherein the motion detection unit having an infra-red reflection distance sensor receiver.

6. The security light of claim 1, wherein the motion detection unit having a passive infrared sensor.

7. The security light of claim 1, wherein the motion detection unit having a light reflection sensor.

8. The security light of claim 1, wherein the motion detection unit having camera.

9. A security light with an adjustable spherical motion sensor, comprising:
   a luminaire housing including at least one lamp head, a mounting portion, and a spherical shroud containing a motion detection unit;
   the spherical shroud including a lens opening;
   the spherical shroud rotatable along a first rotation axis and a second rotation axis, the first rotation axis substantially perpendicular to the second rotation axis;
   a lens covering the lens opening of the spherical shroud and generating a horizontal field of view extending from a first end of the lens to a second end of the lens;
   the motion detection unit mounted within the spherical shroud and behind the lens, the motion detection unit having an optical field of view for motion detection through the lens; and wherein the motion detection unit has a motion detection horizontal field of view through the lens of at least 200 degrees.

10. The security light of claim 9, wherein the spherical motion sensor depends from the luminaire housing.

11. The spherical motion sensor of claim 10, wherein the spherical motion sensor communicates with the security light with a wired connection.

12. The spherical motion sensor of claim 10, wherein the spherical motion sensor communicates with the security light with a wireless connection.

13. The security light of claim 10, wherein the spherical motion sensor detects movement using one of heat signatures, range finding, and distance measurements.

14. A security light with an adjustable spherical motion sensor, comprising:
   a luminaire housing including at least one lamp head, a mounting portion, and a supporting cup for receiving a spherical shroud containing a motion detection unit, the supporting cup adjustably supporting the spherical shroud;
   the spherical shroud wherein the shroud has a lens opening;
   an adjustment mechanism extending on the spherical shroud and interfacing with the supporting cup of the luminaire housing, the spherical shroud rotatable relative to the luminaire housing along a first rotation axis and a second rotation axis;
   a lens covering the lens opening of the spherical shroud and generating a horizontal field of view extending from a first end of the lens to a second end of the lens;

the spherical shroud rotatable along the first rotation axis independent of movement of the supporting cup, the spherical shroud rotatable along the second rotation axis with at least a portion of the supporting cup;

the motion detection unit mounted within the spherical shroud and behind the lens, the motion detection unit having an optical field of view for motion detection through the lens; and wherein the motion detection unit has a motion detection horizontal field of view through the lens of at least 200 degrees.

15. The security light of claim 14, wherein the adjustment mechanism is a ball and knuckle connection.

16. The security light of claim 14, wherein the adjustment mechanism is a two-axis elbow connection.

17. The security light of claim 14, wherein the adjustment mechanism is a gear rack and pinion mechanism.

\* \* \* \* \*